United States Patent Office.

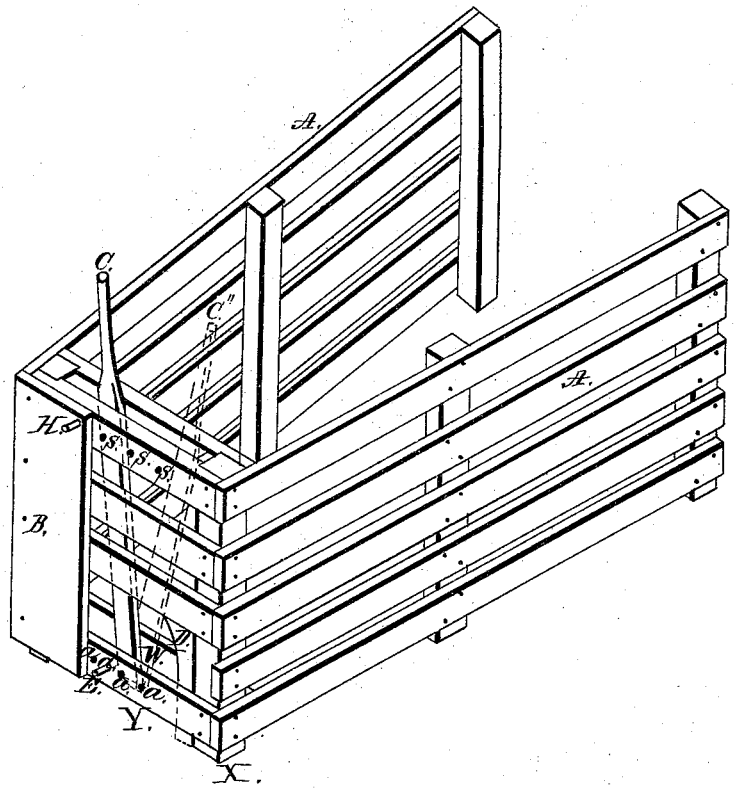

CHARLES B. WEEKS, OF GALESBURG, ILLINOIS, ASSIGNOR TO HIMSELF AND F. H. FERRIS, OF SAME PLACE.

Letters Patent No. 91,887, dated June 29, 1869.

---

IMPROVEMENT IN HOG-TRAP.

---

The Schedule referred to in these Letters Patent and making part of the same.

---

*To all whom it may concern:*

Be it known that I, CHARLES B. WEEKS, of Galesburg, in the county of Knox, and State of Illinois, have invented a new and improved "Hog-Trap;" and I do hereby declare that the following is a full, clear, and exact description thereof, which will enable others skilled in the art to make and use the same, reference being had to the accompanying drawings, forming part of this specification, in which—

Figure 1 is a perspective view of my invention.

Similar letters of reference indicate like parts.

This invention relates to a new and improved device or trap for catching and holding hogs while they are being "snouted," ear-marked, or tied; and The invention consists in a simple device, whereby a hog may be caught by the neck or head, and held firmly and securely while being snouted or otherwise operated upon.

Letter A, in the drawing, represents the two sides of the trap, which may be formed by setting up two panels of ordinary fence; or any common fence may be used for one side, and the other side may be placed in the relative position to it, as represented in the drawings, so that the hog may be easily driven into the trap.

Letter Y represents a panel, forming an end for the sides A, and connecting them together.

Letter B represents a shade-board, placed vertically on the panel Y, for the purpose of concealing from the hog the party operating the catching-lever.

Letter C represents a lever, and

Letter E is a fulcrum for the lever C.

Letters *a a a* represent a series of holes in the bottom board for receiving the pin E.

Letters *s s s* represent a series of holes in the upper board for receiving the pin H.

Letter D represents a block, attached to and projecting from the lower end of the post X, with its outer side curved to fit the neck of a hog.

In operating my machine, the hog is driven in at the open end of the way, and the catching-lever C thrown back from the post X, thereby enlarging the space W, so that the hog may run its head through when the lever C is drawn forward toward the post X, and secured by the pin H, thereby grasping and holding the hog's neck between the said lever and curved neck-block D firmly, while the operator may snout him at his pleasure, or perform any other operation on him which may be required.

The lever C may be operated by a cord, which may be passed over a pulley or pulleys and brought to any convenient spot.

After the hog is operated on, the pin H is withdrawn, and the lever, being thrown slightly back, may be pulled upward, and the animal shoved through, or he may be allowed to pass back, if desired.

The lever C may be operated by hand.

Having thus described my invention,

What I claim as new, and desire to secure by Letters Patent, is—

A hog-trap, consisting of the panels A A and Y, shade-board B, lever C, and curved neck-block D, when constructed, combined, and arranged as shown, and operating in the manner and for the purpose herein set forth and described.

CHAS. B. WEEKS.

Witnesses:
W. B. RICHARDS,
J. M. MARTIN.